US012734722B2

(12) United States Patent
Dereims

(10) Patent No.: US 12,734,722 B2
(45) Date of Patent: Sep. 15, 2026

(54) CONVEYOR FOR A WATER JET CUTTING MACHINE

(71) Applicant: HYDROPROCESS, Chalon sur Saone (FR)

(72) Inventor: Philippe Dereims, Chalon sur Saone (FR)

(73) Assignee: HYDROPROCESS, Chalon sur Saone (FR)

( * ) Notice: Subject to any disclaimer, the term of this patent is extended or adjusted under 35 U.S.C. 154(b) by 117 days.

(21) Appl. No.: 18/729,650

(22) PCT Filed: Jan. 27, 2023

(86) PCT No.: PCT/EP2023/051992
§ 371 (c)(1),
(2) Date: Jul. 17, 2024

(87) PCT Pub. No.: WO2023/144298
PCT Pub. Date: Aug. 3, 2023

(65) Prior Publication Data

US 2025/0153384 A1 May 15, 2025

(30) Foreign Application Priority Data

Jan. 28, 2022 (FR) ...................................... 2200783

(51) Int. Cl.
*B26D 7/06* (2006.01)
*B26F 3/00* (2006.01)

(52) U.S. Cl.
CPC ............ *B26D 7/0625* (2013.01); *B26F 3/004* (2013.01)

(58) Field of Classification Search
CPC ............... Y10T 83/202; Y10T 83/0443; Y10T 83/0453; Y10T 83/2066; Y10T 83/2068;
(Continued)

(56) References Cited

U.S. PATENT DOCUMENTS 4,846,774 A * 7/1989 Bell ..................... B31D 1/0018 493/344
5,349,788 A * 9/1994 Nedo ...................... B26F 3/008 451/75
(Continued)

FOREIGN PATENT DOCUMENTS

DE 2801526 A1 7/1979
EP 1197307 A1 4/2002

OTHER PUBLICATIONS

International Search Report issued on Mar. 22, 2023, in corresponding International Application No. PCT/EP2023/051992, 4 pages.
(Continued)

*Primary Examiner* — Phong H Nguyen
(74) *Attorney, Agent, or Firm* — Maier & Maier, PLLC

(57) ABSTRACT

A conveyor for moving products P to be cut by a jet of high-pressure liquid exiting a nozzle of a cutting machine in a vertical direction, including a plurality of continuous loops arranged parallel to one another and stretched between two drive rollers so that each determines an upper run and a lower run, each loop including at least two longitudinal walls; and two guide members associated with at least each of the loops and arranged between the two drive rollers, and enabling the upper run of the at least one associated loop to be twisted so that its longitudinal walls are, between the two guide members, parallel to the direction D.

11 Claims, 3 Drawing Sheets

(58) Field of Classification Search
CPC ............... Y10T 83/2192; Y10T 83/647; Y10T 83/6472; B26D 7/0625; B26F 3/004; B65G 15/12; B65G 15/60; B65G 15/62; B65G 15/64; B65G 2201/02
See application file for complete search history.

(56) References Cited

U.S. PATENT DOCUMENTS

| | | | | |
|---|---|---|---|---|
| 6,098,512 | A * | 8/2000 | Life | B26F 1/3813 83/53 |
| 2003/0019723 | A1 * | 1/2003 | Rudy | B26D 7/20 198/493 |
| 2007/0175737 | A1 * | 8/2007 | Honeycutt | B65G 15/62 198/822 |
| 2020/0031580 | A1 * | 1/2020 | Behrens | B65G 15/08 |
| 2021/0179304 | A1 * | 6/2021 | Lovedale | B65B 25/065 |

OTHER PUBLICATIONS

International Preliminary Report on Patentability issued on May 3, 2024, in corresponding International Application No. PCT/EP2023/051992, 11 pages.

* cited by examiner

[Fig. 1]
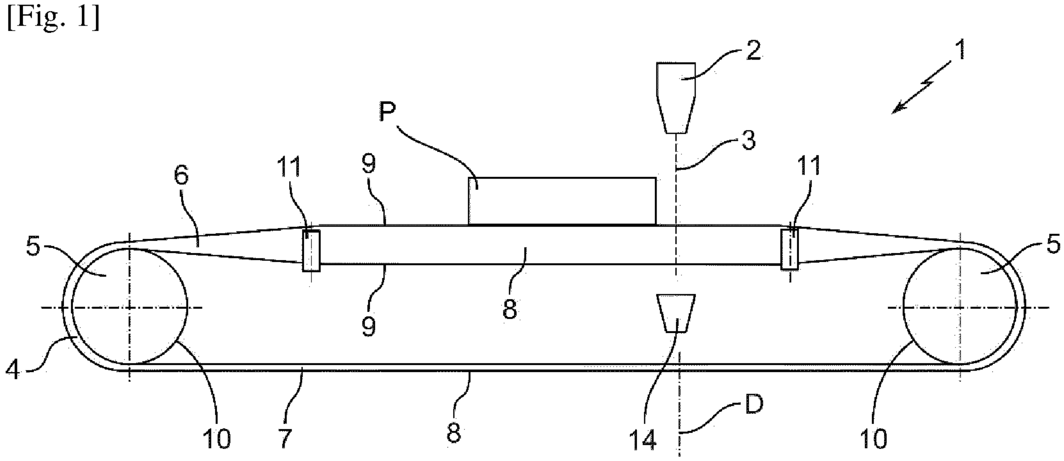
[Fig. 2]
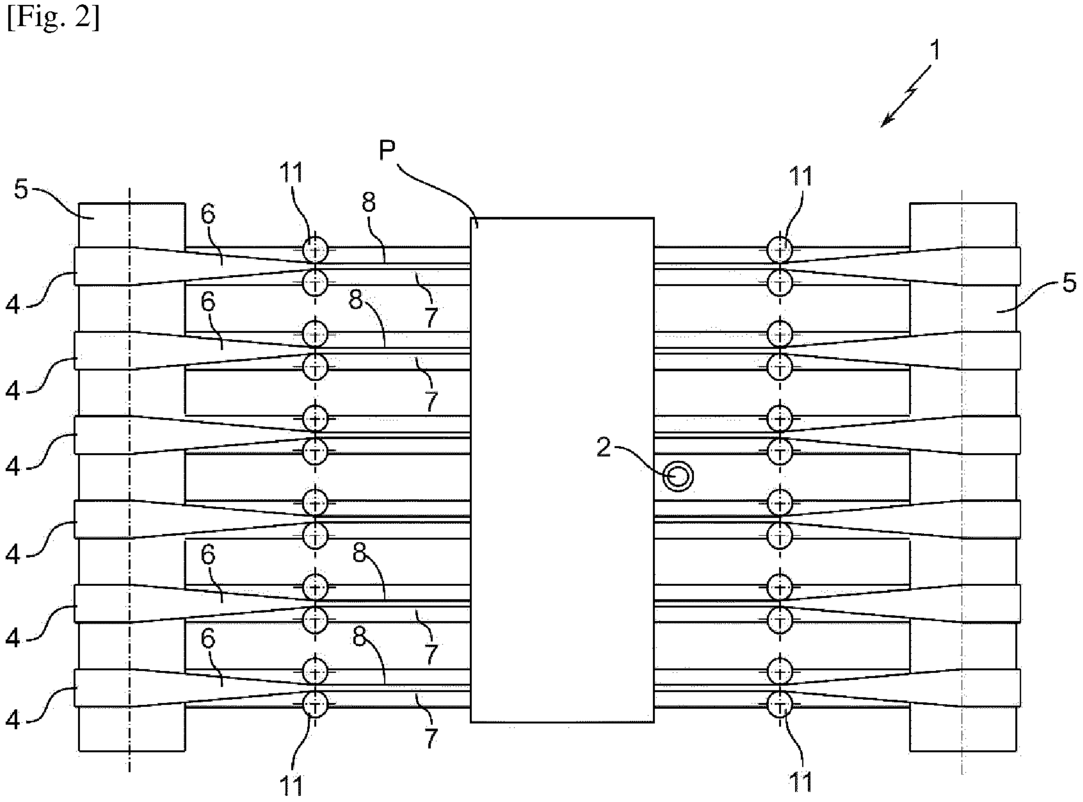
[Fig. 3]
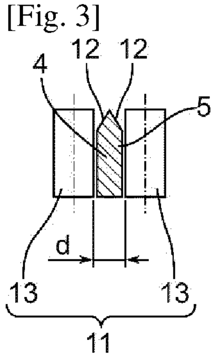

[Fig. 4]
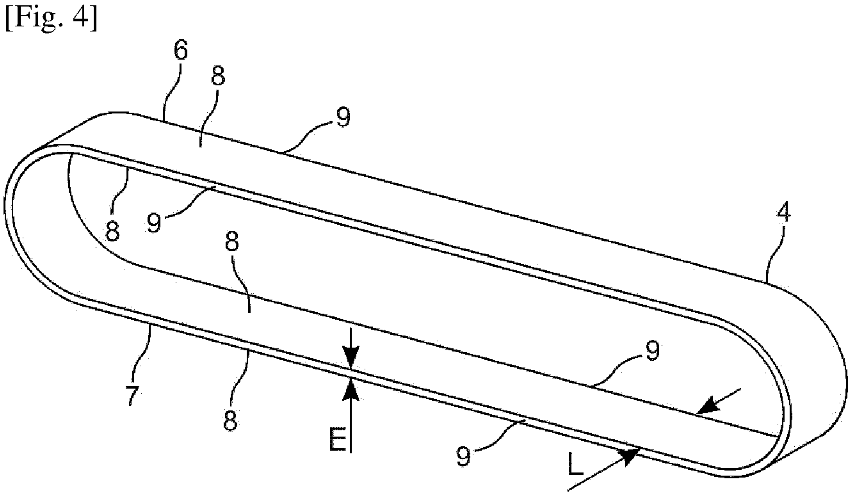
[Fig. 5]
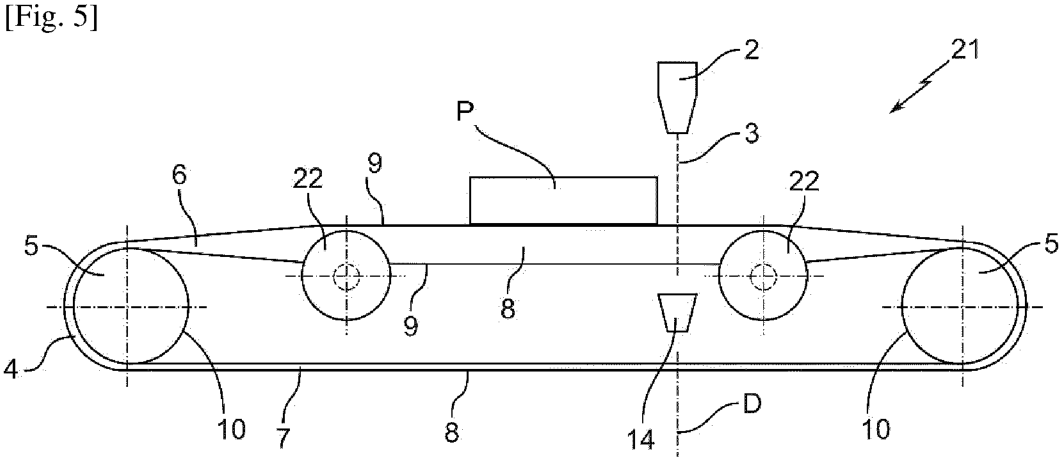
[Fig. 6]
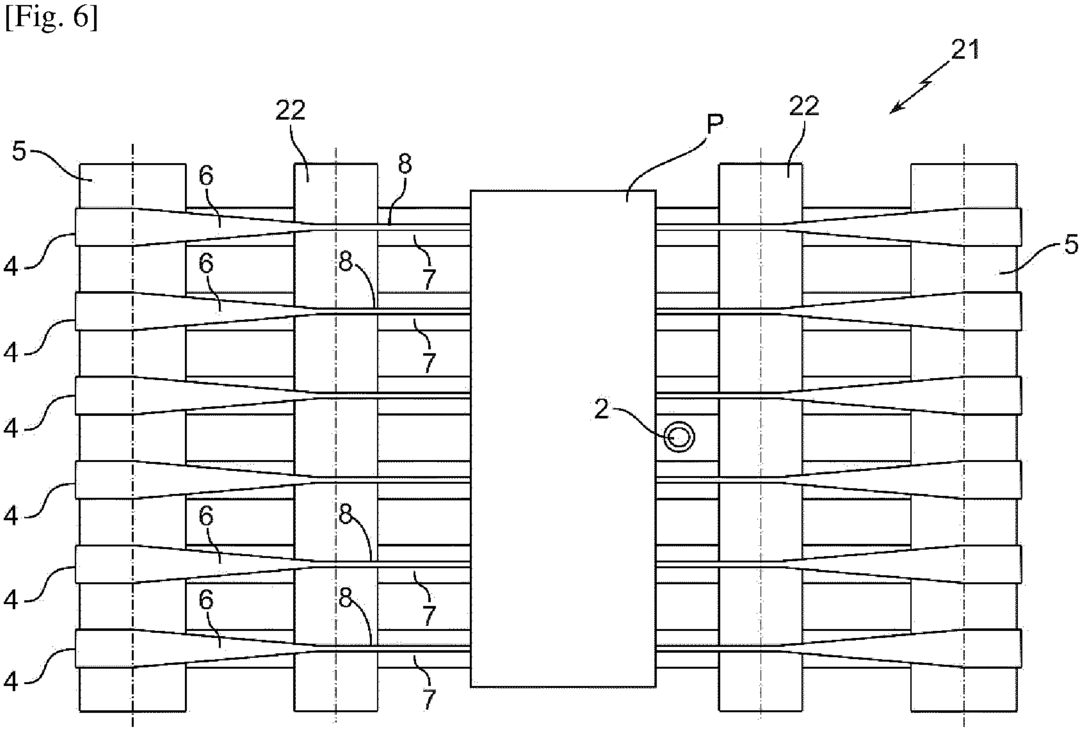

[Fig. 7]
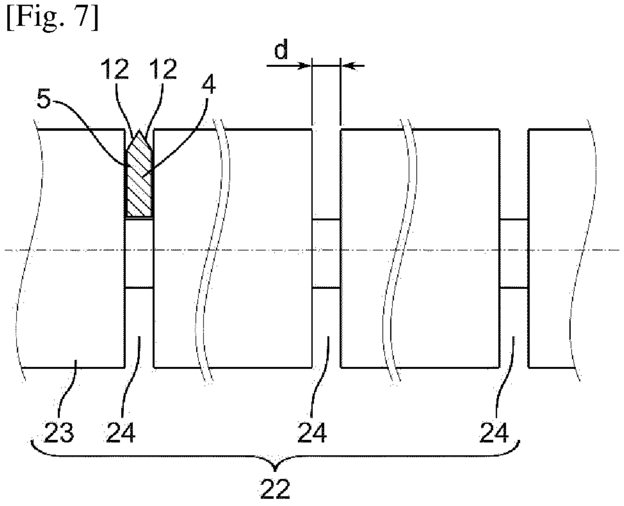
[Fig. 8]
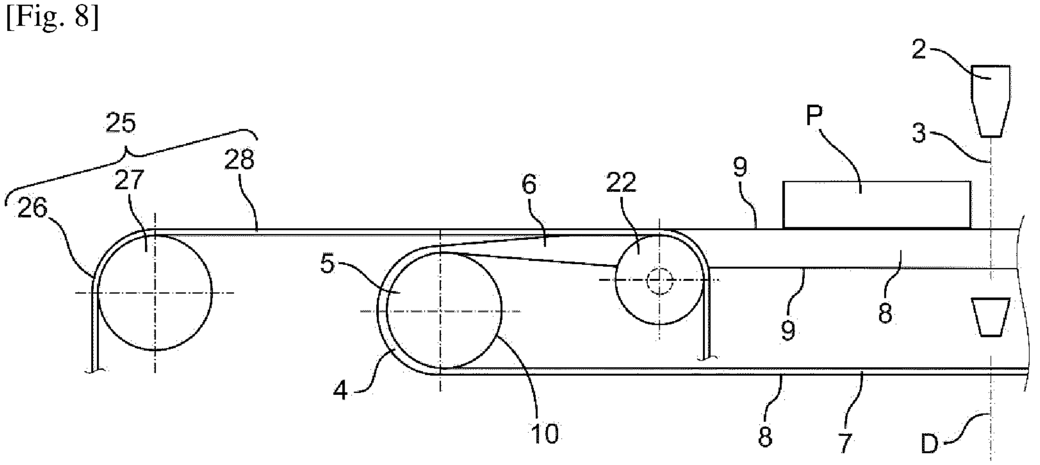
[Fig. 9]
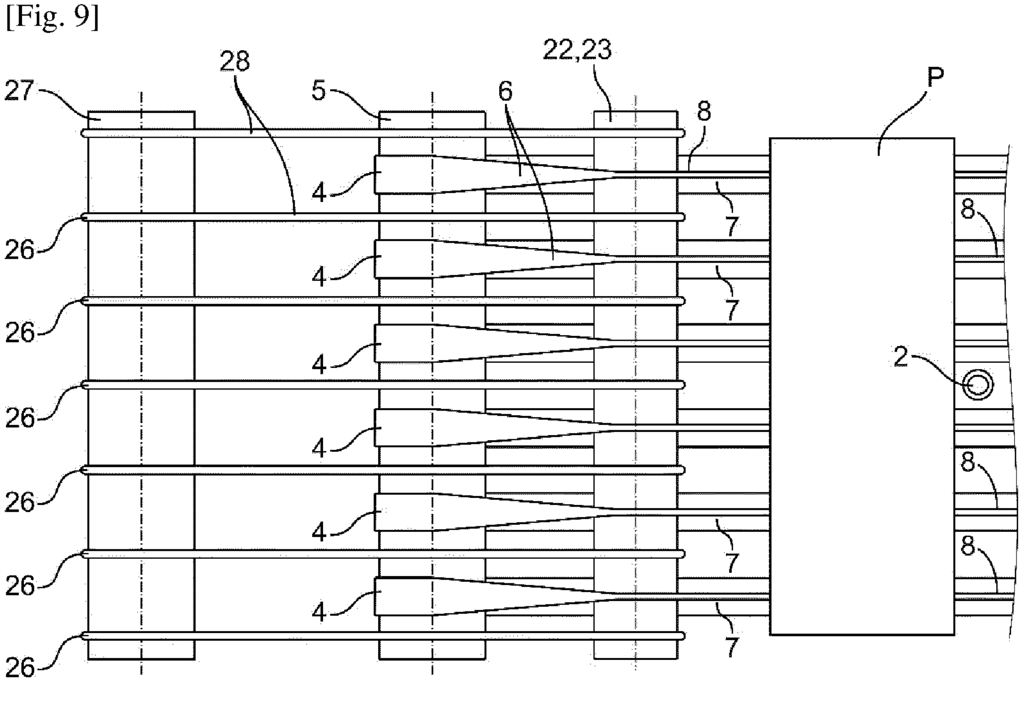

CONVEYOR FOR A WATER JET CUTTING MACHINE

TECHNICAL FIELD

The present invention relates to the general field of machines for cutting products, for example food products, by water jet and more particularly a conveyor for moving said products to be cut under the nozzle of a water jet cutting machine.

BACKGROUND

In the field of products, in particular food products, cutting, it is known to use water jet cutting machines consisting of a frame on which are mounted a loading tray which is movable or not in the form of a grid and supporting the products to be cut, and a movable cutting head consisting of a nozzle and secured either to a carriage moving according to a longitudinal or transverse translational movement, or to the free end of an arm pivotable about a vertical axis above said plate; said carriage or arm being actuated by electric motors or the like.

This type of water jet cutting machines is certainly efficient, but it has the drawback of requiring the use of a loading platform and, consequently, making it impossible to continuously cut the products, since it is necessary to remove said loading tray in order to remove the cut products and to place on the latter new products to be cut. Hence, this type of water jet cutting machines is not easily compatible with automation of the movement of the products to be cut.

To partially overcome this drawback, there are conveyors for moving products to be cut under the nozzle of a water jet cutting machine, this type of conveyors consisting of a continuous belt made of metal meshes supporting the products to be cut and being stretched between two rolls, one of which is associated with a drive means in order to move said continuous belt to move said products to be cut.

Although effective, this conveyor type has the major drawback of considerably wetting the products to be cut due to splashes of the water jet on the metal meshes of the continuous belt, which is not acceptable for food type products.

SUMMARY

Hence, the present invention aims to provide a conveyor for moving products to be cut under the nozzle of a water jet cutting machine, easy to implement and to clean while guaranteeing an optimum result, i.e. a clean cut without excessive moisture on the cut-out products, the conveyor enabling easy automation of the movement of the products to be cut and therefore of the continuous cutting of said products.

In accordance with the invention, a conveyor of a high-pressure liquid jet cutting machine is provided for moving products P to be cut under a jet of high-pressure liquid coming out according to a vertical direction D of a nozzle of said cutting machine, remarkable in that it includes at least:

- a plurality of continuous loops with a width L and with a thickness E arranged parallel to one another and stretched between two drive rolls so that each determines an upper run and a lower run, each loop comprising at least two longitudinal walls and being arranged so that the longitudinal walls of at least one portion of the upper and lower runs are perpendicular to the direction D, and
- two guide members associated with at least each of the loops and arranged between the two drive rolls, these two guide members allow twisting the upper run of the at least one associated loop so that its longitudinal walls are, between said two guide members, parallel to said direction D.

Advantageously, each guide member includes two cylindrical rollers arranged on either side of the associated loop so as to be spaced apart from one another by a distance d slightly larger than the thickness E of the associated loop, each cylindrical roller being mounted fixed or pivotable about an axis belonging to a plane perpendicular to the axis of rotation of the drive rolls.

Preferably, the two cylindrical rollers are each mounted fixed or pivotable about an axis parallel to the direction D.

According to another embodiment, each guide member includes a cylindrical roll pivotably mounted about an axis perpendicular to the direction D and parallel to the axis of rotation of the drive rolls and provided with a plurality of radial grooves each receiving a loop, each radial groove having a width d slightly larger than the width E of the associated loop.

According to another embodiment, the conveyor is associated with an input conveyor allowing bringing the products P to be cut on said conveyor and/or an output conveyor allowing evacuating the cut products P off said conveyor, each input conveyor or output conveyor including a plurality of continuous belts arranged parallel to one another and stretched between at least one cylindrical roll pivotably mounted about an axis perpendicular to the direction D of the jet coming out of the nozzle and parallel to the axis of rotation of the drive rolls of the loops of the conveyor, and one of the guide members of said conveyor so that each determines an upper run and a lower run, at least said upper runs of the belts being arranged on the cylindrical roll of the corresponding guide member between said loops.

Advantageously, each loop may be twisted so that it is in contact with the outer wall of one of the drive rolls by one amongst its longitudinal walls and in contact with the outer wall of the other drive roll by the other one amongst its longitudinal walls.

According to another embodiment, each loop is twisted like a Moebius ring.

Advantageously, each loop includes at least one bevel along the longitudinal edge of one amongst its longitudinal walls opposite the jet coming out of the nozzle between said two guide members.

Preferably, each loop includes a bevel along the longitudinal edge of each of its longitudinal walls opposite the jet coming out of the nozzle between said two guide members.

Advantageously, the conveyor includes adjustable tensioning means of each loop allowing obtaining, by means of an actuator, a predetermined tension, adapted and constant during the operation of each loop and, on the contrary, a rapid expansion of said loop for replacement thereof.

The invention also relates to a cutting machine including at least one nozzle from which a jet of high-pressure liquid comes out according to a vertical direction D including a conveyor according to the invention, remarkable in that it includes a funnel-like shaped receptacle arranged vertically in line with the nozzle and between the upper and lower runs of the loops enabling recovery and discharge of the cutting effluents during the cutting phase.

BRIEF DESCRIPTION OF THE FIGURES

Other advantages and features will appear better from the following description of an embodiment of the invention, with reference to the appended figure wherein:

FIG. 1 is a schematic side view of a conveyor in accordance with the invention for moving products to be cut under the nozzle of a water jet cutting machine, FIG. 2 is a schematic top view of the conveyor of FIG. 1, FIG. 3 is a schematic view of a guide member of the conveyor of the FIG. 1, FIG. 4 is a schematic perspective view of a loop of the conveyor of FIG. 1, FIG. 5 is a schematic side view of a second embodiment of the conveyor in accordance with the invention for moving products to be cut under the nozzle of a water jet cutting machine, FIG. 6 is a schematic top view of the conveyor of FIG. 3, FIG. 7 is a schematic view of a guide member of the conveyor of FIG. 3, FIG. 8 is a schematic side view of a third embodiment of the conveyor in accordance with the invention for moving products to be cut under the nozzle of a water jet cutting machine, FIG. 9 is a schematic top view of the conveyor of FIG. 8.

DETAILED DESCRIPTION

Referring to FIGS. 1 to 3, a conveyor 1 for moving products P to be cut under at least one nozzle 2 of a liquid jet, conventionally water, cutting machine, has been illustrated in a partial schematic view, said cutting machine not being shown so as not to overload the figures. A jet 3 of high-pressure liquid comes out of said nozzle 2 according to a vertical direction D.

Without departing from the scope of the present invention, the direction D of said jet 3 could be more or less inclined with respect to the vertical, the terms such as, for example, vertical, horizontal, upper or lower, will then be adapted.

Moreover, in the figures, only one nozzle 2 is shown, but it goes without saying that the cutting machine associated with the conveyor 1 according to the invention may include several nozzles 2.

Said conveyor 1 includes a plurality of continuous loops 4 arranged parallel to one another and stretched between two cylindrical drive rolls 5.

Referring to FIG. 3, each of these loops 4 determines, between the two drive rolls 5, an upper run 6 and a lower run 7 extending respectively above and below said two drive rolls 5. Moreover, each loop 4 has a cross-section with a rectangular general shape whose length and width respectively determine the width 1 and the thickness E of the loop 4, The latter then including two longitudinal walls 8 connected by two lateral walls 9.

Referring to FIGS. 1 to 2, each loop 4 is arranged on one of its sidewalls at least at the level of each of said drive rolls 4, i.e. one of its longitudinal walls 8 is in contact with the outer wall 10 of said drive rolls 5. The longitudinal walls 8 of at least one portion of the upper 6 and lower 7 runs are then perpendicular to the direction D of the high-pressure liquid jet 3 coming out of the nozzle 2.

By "having a rectangular general shape", it should herein be understood the fact that the cross-section of each loop 3 is not strictly limited to the rectangular shape, the angles of said cross-section could be not just right angles but rounded or chamfered or bevelled, without departing from the scope of the present invention.

Furthermore, by "parallel", it should be understood the fact that elements or portions of elements of the conveyor 1 according to the invention form an angle therebetween comprised between 0 and 20°. Similarly, by "perpendicular", it should be understood the fact that elements or portions of elements of said conveyor 1 form an angle therebetween comprised between 70° and 110°.

The conveyor 1 according to the invention further includes at least two guide members 11 associated with at least each of the loops 4 and arranged between the two drive rolls 5. These two guide members 11 allow twisting the upper run 6 of the at least one associated loop 4 by 90° so that, between said two guide members 11, said upper run 6 is directed on its edge, i.e. its longitudinal walls 8 are, between said two guide members 11, parallel to the direction D of the jet 3 of liquid coming out of the nozzle 2.

In this configuration, it is then possible to arrange the product(s) P to be cut on the top of the upper runs of the loops 4 between said two guide members 11. Thus, when the drive rolls 5 move, they drive each loop 4 and move the product(s) P to be cut under the nozzle 2 between said two guide members 11, in order to proceed with cutting of said products P by the jet 3.

It should be understood that, with this configuration, it is possible to achieve a continuous automation of cutting of the products P by associating, directly or via other conveyors conventionally of the roll type, at the ends of the conveyor 1, stations for preparing the products P to be cut and for packaging the cut products P.

Moreover, twisting 90° the upper run 6 of each loop 4 allows having a stable support of the products P to be cut, without any risk of damaging the loop 4 since, between said two guide members 11, the upper run 6 of the latter is arranged on the edge, so as to have a narrowest wall, namely one of its lateral walls 9, opposite the jet 3 coming out of the nozzle 2.

Moreover, to further limit the impact of the water jet coming out of the nozzle 2 on the upper run 5 between said two guide members 11, each loop 4 includes at least one bevel 12 along the longitudinal edge of one of its longitudinal walls 8 opposite the jet 3 coming out of the nozzle 2 between said two guide members 11. Preferably, each loop 3 includes a bevel 12 along the longitudinal edge of longitudinal walls 8 opposite the jet 3 coming out of the nozzle 2 between said two guide members 11 (cf. FIG. 3).

Referring to FIGS. 1 to 3, each guide member 11 includes two cylindrical rollers 13 arranged on either side of the associated loop 4 so as to be spaced apart from one another by a distance d slightly larger than the thickness E of the associated loop 4 so as to enable the passage of the upper run 6 of the loop 4 and to hold said upper run 6 on its edge between said two guide members 11. Each of the two cylindrical rollers 13 is pivotably mounted about an axis parallel to the direction D of the jet 3 coming out of the nozzle 2, the axis of each of said two cylindrical rollers 13 belonging to a plane perpendicular to the axis of rotation of the drive rolls 5. Advantageously, the height of the cylindrical rollers 13 is smaller than or equal to the width 1 of each loop 4.

The axes of said two cylindrical rollers 13 may be not parallel to the direction D of the jet 3 coming out of the nozzle 2, but inclined with respect to the latter, without departing from the present invention.

A person skilled in the art will have no difficulty in determining the dimensions and the relative position of the cylindrical rollers 13 according to the dimensions of each loop 4.

FIGS. 5 to 7 show a conveyor 21 according to a second embodiment of the invention. This conveyor 11 differs from the previously-described conveyor 1 only in that it includes guide members 22 different from the previously-described guide members 11. Thus, each guide member 22 includes a cylindrical roll 23 pivotably mounted about an axis perpendicular to the direction D of the jet 3 coming out of the nozzle 2 and in the direction of movement of the loops 4 and provided with a plurality of radial grooves 24 each receiving a loop 4. It should be understood that in the described configuration, the axis of rotation of each cylindrical roll 23 is also parallel to the axis of rotation of the drive rolls 5. Each radial groove 24 has a width d slightly larger than the width E of the associated loop 4 so as to enable the passage of the upper run 6 of the loop 4 and to hold the portion 12 of said upper run 6 on its edge. Advantageously, the depth of each radial groove 24 is smaller than or equal to the width L of each loop 4.

FIGS. 5 to 7 show each guide member 22 of the conveyor 21 including a cylindrical roll 23 provided with a plurality of radial grooves 24, but it goes without saying that, without departing from the scope of the present invention, each guide member 22 could include a plurality of cylindrical rolls arranged coaxially one after another and each provided with one or more radial groove(s) 24.

A person skilled in the art will have no difficulty in determining the dimensions of the radial grooves 24 according to the dimensions of each loop 4.

Even though the cylindrical rollers 13 and cylindrical rolls 23 are preferably pivotally mounted in order to limit frictions and therefore wear, it goes without saying that said cylindrical rollers 13 and cylindrical rolls 23 could be fixedly mounted, without departing from the scope of the present invention.

Advantageously, the conveyor 1, 21 includes adjustable means, not shown, for tensioning each loop 4 allowing obtaining, by means of an actuator such as, for example, an air cylinder or a hydraulic cylinder, a predetermined, adapted and constant tension in operation of each loop 4 and, on the contrary, a rapid relief of said loop 4 for replacement thereof.

Moreover, in contrast with to FIG. 4, each loop 4 may be twisted during mounting thereof so that it is in contact with the outer wall 10 of one of the drive rolls 5 by one amongst its longitudinal walls **8*e* in contact with the outer wall 10 of the other roller by the other one amongst its longitudinal walls 8**.

Similarly, according to another embodiment, each loop 4 may be twisted during manufacture thereof like a Moebius ring.

It should be understood that the conveyor 1, 21 according to the invention can be used not only to continuously translate products P to be cut under the jet 3 of high-pressure liquid from the nozzle 2, but it could also contribute to cutting of said products P by making them go back-and-forth under said jet 3, in particular in the case of a nozzle 2 moving only according to a direction transverse to the loops 4.

According to a third embodiment shown in FIGS. 8 and 9, the conveyor 21 of FIGS. 5 to 7 may be associated with an input conveyor 25 allowing bringing the products P to be cut on said conveyor 21 and/or an output conveyor allowing evacuating the cut products P off said conveyor 21. Each input or output conveyor 25 includes a plurality of continuous belts 26 arranged parallel to one another and stretched between at least one cylindrical roll 27 pivotably mounted about an axis perpendicular to the direction D of the jet 3 coming out of the nozzle 2 and parallel to the axis of rotation of the drive rolls 5 of the loops 4 of the conveyor 21, and one of the guide members 22 of said conveyor 21 so that each determines an upper run 28 and a lower run, at least said upper runs 28 of the belts being arranged on the cylindrical roll 23 of the corresponding guide member 22 between said loops 4. Advantageously, the belts 26 have a circular cross-section. With this particular configuration, it should be understood that the input 25 or output conveyor will be perfectly synchronised with the conveyor 21, thereby facilitating transition with another upstream or downstream conveyor, because the area before or after the area where the loops 4 are twisted vertically is not particularly stable due to progressive twisting.

Finally, the cutting machine associated with the conveyor 1, 21 advantageously includes a receptacle 14 advantageously in the form of a funnel arranged vertically in line with the nozzle 2 and between the upper 6 and lower 7 runs of the loops 4 in order not to damage said lower run 7, said receptacle 14 being conventionally connected at the lower portion to piping, not shown, advantageously flexible, enabling the discharge of the cutting effluents during the cutting phase.

Similarly, the conveyor 1, 21 according to the invention is advantageously integrated into a water jet cutting machine, but it could also be integrated into other types of cutting machines such as, for example, a laser cutting machine.

Finally, it goes without saying that the examples of the conveyor 1, 21 in accordance with the invention that have just been described are merely particular, in no way limiting, illustrations of the invention.

The invention claimed is:

1. A cutting machine comprising at least a nozzle from which a jet of high-pressure liquid comes out according to a vertical direction D, and a conveyor for moving products P to be cut under said jet of high-pressure liquid, said conveyor comprising at least:

a plurality of continuous loops with a width L and with a thickness E arranged parallel to one another and stretched between two drive rolls so that each determines an upper run and a lower run, each loop comprising at least two longitudinal walls and being arranged so that the longitudinal walls of at least one portion of the upper and lower runs are perpendicular to the direction D, and two guide members associated with at least each of the loops and arranged between the two drive rolls, these two guide members allow twisting the upper run of the at least one associated loop so that its longitudinal walls are, between said two guide members, parallel to said direction D.

2. The cutting machine according to claim 1, wherein each guide member includes two cylindrical rollers arranged on either side of the associated loop so as to be spaced apart from one another by a distance d slightly larger than the thickness E of the associated loop, each cylindrical roller being mounted fixed or pivotable about an axis belonging to a plane perpendicular to the axis of rotation of the drive rolls.

3. The cutting machine according to claim 2, wherein the two cylindrical rollers are each mounted fixed or pivotable about an axis parallel to the direction D.

4. The cutting machine according to claim 1, wherein each guide member includes a cylindrical roll pivotably mounted about an axis perpendicular to the direction D and parallel to the axis of rotation of the drive rolls and provided with a plurality of radial grooves each receiving a loop, each radial groove having a width d slightly larger than the width E of the associated loop.

5. The cutting machine according to claim 4, wherein an input conveyor allows bringing the products P to be cut on said conveyor and/or an output conveyor allowing evacuating the cut products P off said conveyor, each input conveyor or output conveyor including a plurality of continuous belts arranged parallel to one another and stretched between at least one cylindrical roll pivotably mounted about an axis perpendicular to the direction D of the jet coming out of the nozzle and parallel to the axis of rotation of the drive rolls of the loops of the conveyor, and one of the guide members of said conveyor so that each determines an upper run and a lower run, at least said upper runs of the belts being arranged on the cylindrical roll of the corresponding guide member between said loops.

6. The cutting machine according to claim 1, wherein each loop is twisted so that it is in contact with the outer wall of one of the drive rolls by one amongst its longitudinal walls and in contact with the outer wall of the other drive roll by the other one amongst its longitudinal walls.

7. The cutting machine according to claim 1, wherein each loop is twisted like a Moebius ring.

8. The cutting machine according to claim 1, wherein each loop includes at least one bevel along the longitudinal edge of one amongst its longitudinal walls opposite the jet coming out of the nozzle between said two guide members.

9. The cutting machine according to claim 8, wherein each loop includes a bevel along the longitudinal edge of each of its longitudinal walls opposite the jet coming out of the nozzle between said two guide members.

10. The cutting machine according to claim 1, further comprising adjustable tensioning means of each loop allowing obtaining, by means of an actuator, a predetermined tension, adapted and constant during the operation of each loop and, on the contrary, a rapid expansion of said loop for replacement thereof.

11. The cutting machine according to claim 1, further comprising a funnel-like shaped receptacle arranged vertically in line with the nozzle and between the upper and lower runs of the loops enabling recovery and discharge of the cutting effluents during the cutting phase.

* * * * *